Dec. 15, 1953 F. R. DALY 2,662,232
TRANSPORTABLE SHELTER
Filed Sept. 28, 1950 3 Sheets-Sheet 1
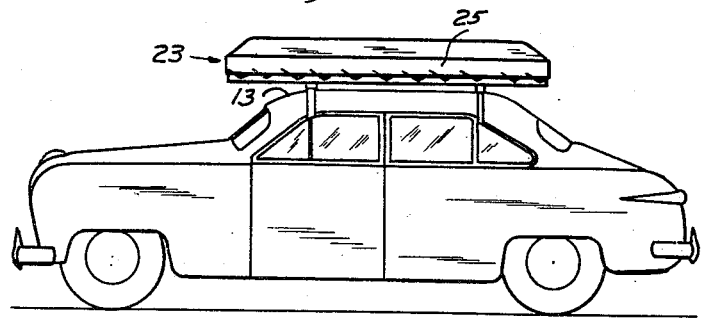
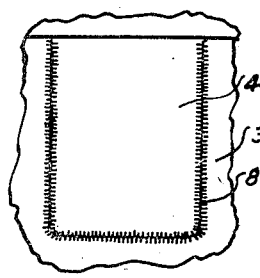
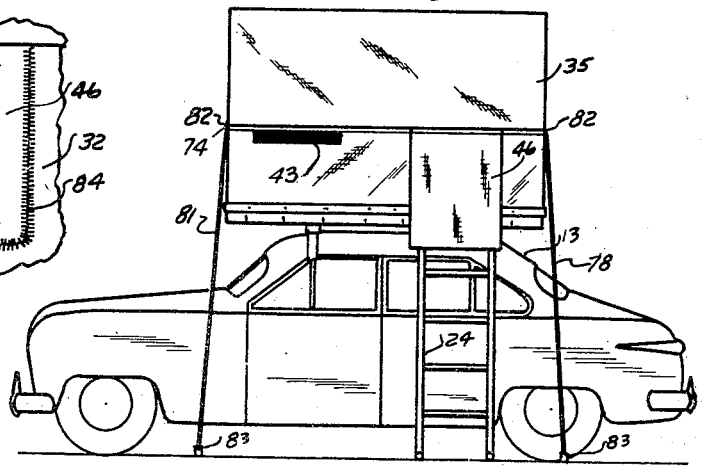
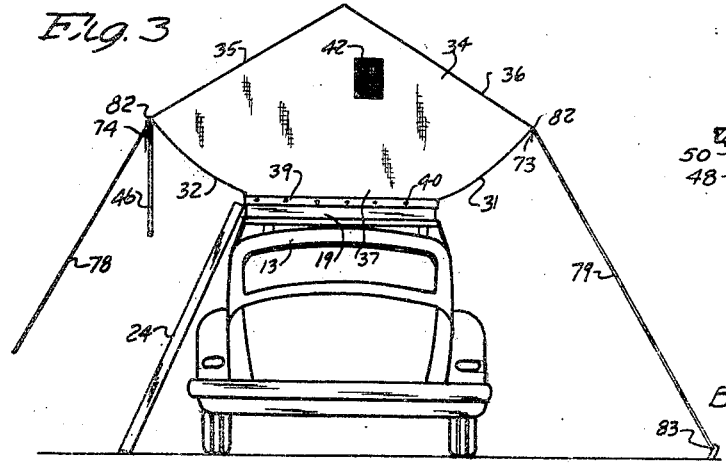
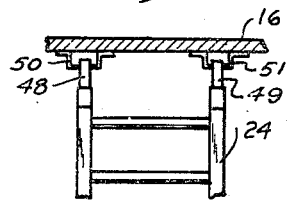
INVENTOR
FRANCIS R. DALY
BY Whiteley and Caine
ATTORNEYS Dec. 15, 1953     F. R. DALY     2,662,232
TRANSPORTABLE SHELTER
Filed Sept. 28, 1950     3 Sheets-Sheet 2
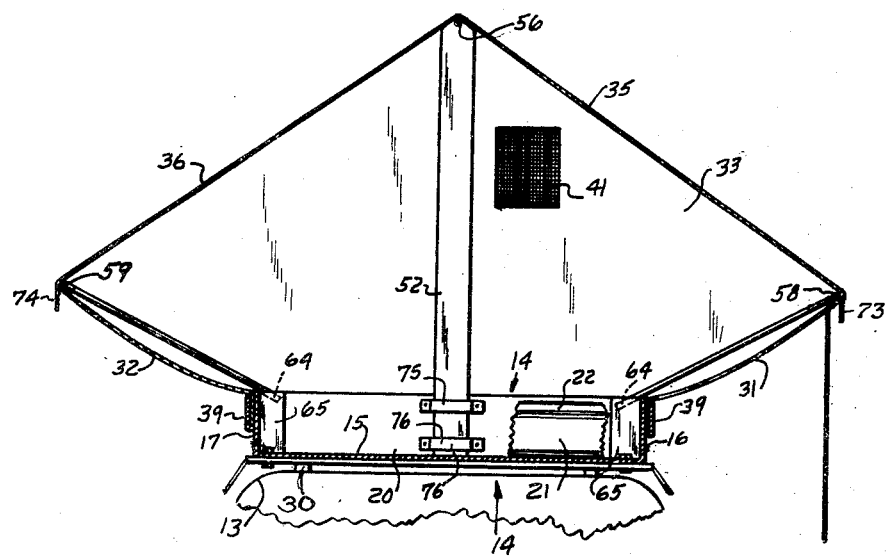
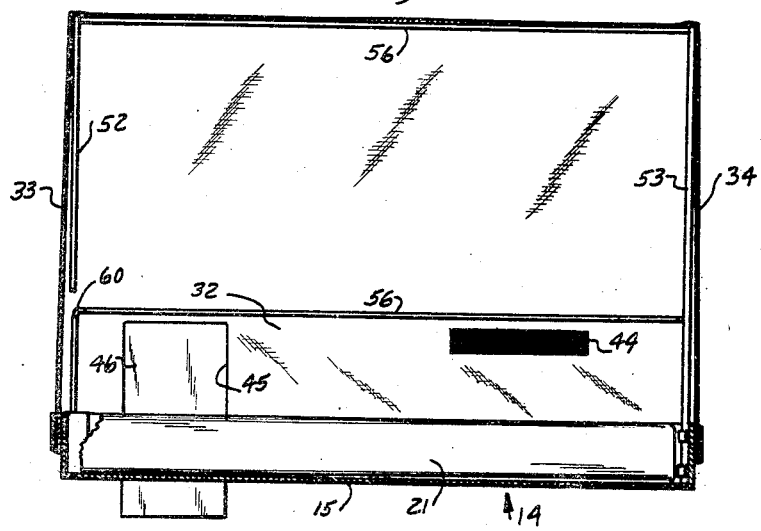
INVENTOR
FRANCIS R. DALY
ATTORNEYS Dec. 15, 1953  F. R. DALY  2,662,232
TRANSPORTABLE SHELTER
Filed Sept. 28, 1950  3 Sheets-Sheet 3
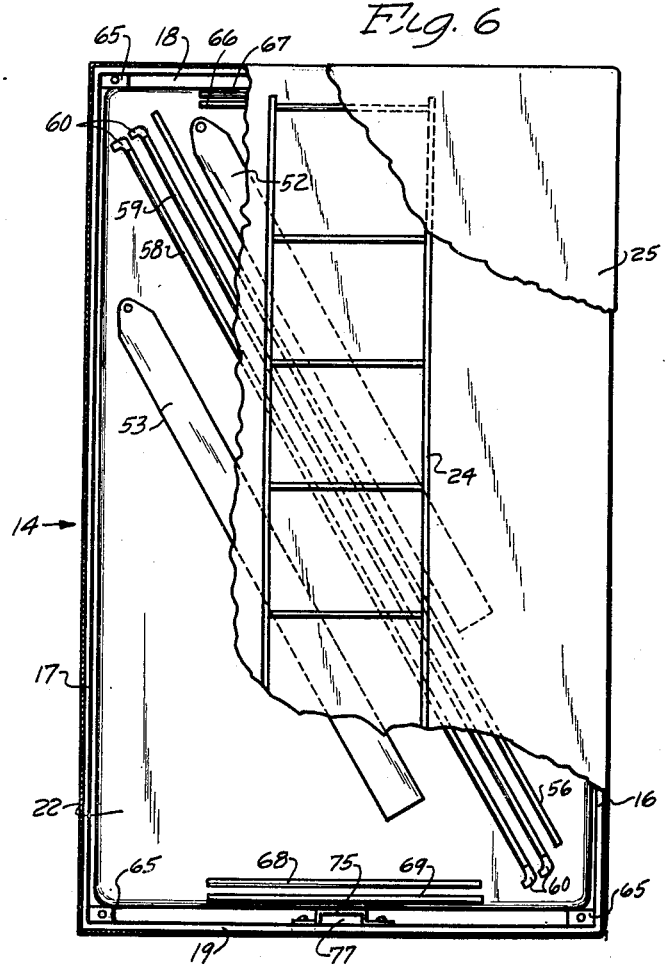
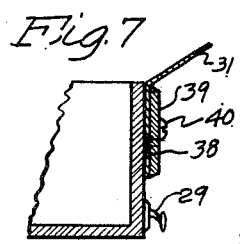
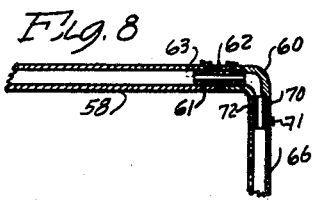
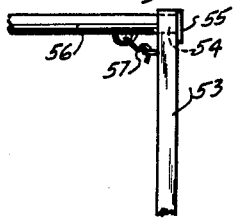
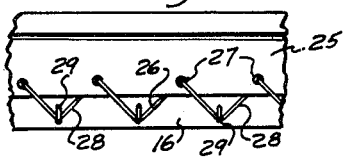
INVENTOR
FRANCIS R. DALY
BY Whiteley and Caine
ATTORNEYS Patented Dec. 15, 1953

2,662,232

UNITED STATES PATENT OFFICE 2,662,232

TRANSPORTABLE SHELTER

Francis R. Daly, Minneapolis, Minn.

Application September 28, 1950, Serial No. 187,276

5 Claims. (Cl. 5—119)

1

The present invention relates to improvements in a transportable shelter adapted for transportation and erection on the top of a motor vehicle, and in the provision of a dry entrance, dry storage, and proper ventilation of the interior of the shelter during inclement weather. In particular, the invention is concerned with a tent adapted to be mounted on the top of a vehicle and arranged with laterally extending side portions that extend beyond the lateral limits of the vehicle and in which is formed a dry entrance, ventilation and dry storage during inclement weather.

This invention is concerned with the provision of improved sleeping quarters for the occupants of a motor vehicle during transit or when the occupants are camping, or for other reasons have no other suitable sleeping quarters. In the past, numerous arrangements have been made to provide temporary sleeping quarters for vehicle occupants in transit. Some arrangements have included adjustment of the seats or other parts of the interior of the vehicle to form beds, but these arrangements are undesirable in that they cause crowding and generally require unloading items from the interior of the vehicle. Other arrangements for providing sleeping quarters have consisted of transportable shelters, and have included shelters that are adapted to be carried on the top of the vehicle, similar to the present arrangement. The difficulty with these latter forms of temporary sleeping quarters has been in the difficulty of providing a protected entry way into the shelter during inclement weather, and in providing protected ventilation during inclement weather. The prior arrangements generally provided the usual doors or entry ways which are neither insect tight nor secure against entry of the elements during inclement weather. Moreover, the prior arrangements by having the conventional entry extended for a substantial distance above the upper limits of the vehicle, therefore created additional supporting problems by way of wind resistance.

In the present invention I have provided a transportable shelter with a protected entrance, a dry storage area of extra clothing, and a weatherproof form of ventilation during inclement weather. The arrangement consists of a tent whose lower limits are secured to a base member that is carried on the top of the vehicle. The necessary ridge pole and other supporting elements for the tent are carried within the base member, and a set of spreader arms are also carried by the base member, and when in an erected position extend lateral portions of the tent material beyond the base member and beyond the lateral limits of the motor vehicle. This arrangement causes the tent material to form an overhanging protecting portion and an underhanging portion which extends inwardly from the spreader arms to the base member. Within these underhanging portions, which are protected from the elements by the overhanging portions of the tent, is formed an entry way as well as a screened opening to provide insect-tight ventilation. The underhanging portions are protected at their outer limits by downwardly extending eaves that prevent rain water from flowing inwardly. To form a closable entrance, a flap formed of the underhanging material may be suitably closed and fastened. To gain entrance into the interior of the tent, a ladder normally carried on the base member, is utilized and may be pulled into the interior of the tent when the tent is occupied. The laterally extending underhanging portions, in addition to providing an entrance and ventilated portion, may also be used as a dry storage area for unused clothing during the period of occupancy.

By extending the sides of the tent beyond the lateral limits of the vehicle and providing a lower entrance through the underhanging portions of the tent, the overall dimension of the tent is reduced, thus reducing the wind resistance thereof, and at the same time increasing the head space within the tent. However, the principal advantage resides in the provision of a protected entry way which will permit entrance into the tent during inclement weather so that occupants may enter and leave the tent without being subjected to the elements.

Moreover, the base member, which may be in the form of an open-topped rectangular box, contains all of the necessary bedding as well as the supporting and spreading members necessary to raise and support the tent. When the shelter is not in use, all of the elements, including the tent, the ladder, the spreaders, and supporting elements may be compactly carried within the box-like base member on top of the vehicle. This permits the formation of a package in transit which is very compact and streamlined and which does not add enough either in weight or in wind resistance to substantially increase the cost of operation of the automobile or decrease its speed.

An object of the invention is to provide a transportable sheleter that is adapted for transportation in a knocked-down condition on the top of a motor vehicle, and which when erected on the vehicle, extends on either lateral side thereof, and is constructed with a lower entrance into the interior thereof to provide a protected entry during inclement weather.

Another object is to provide a transportable shelter formed of a base, a top cover which extends beyond the lateral limits of the base, and an underhang or eave beneath the top cover on either side of the base to permit entry into the shelter through the underhang or eave by means of a ladder which is adapted to be positioned under the top cover.

Another object is to provide a transportable shelter formed of a base, a top cover which extends beyond the lateral limits of the base when in erected position, and an underhang or eave which extends inwardly from the lateral limits of the top cover to the base and which may contain a closable flap as well as ventilating means permitting ventilation and entrance into the shelter from beneath the eave or underhang.

A further object is to provide a transportable shelter which includes the usual bedding contained within a box, and a tent composed of end walls and a lateral cover, together with the usual ridge pole support and lateral spreaders which when in operative position extend the lateral cover beyond the lateral limits of the box and form a fabric underhang on either side of the box to provide greater head space, an entrance, storage space and ventilation during inclement weather, said shelter being adapted for mounting on the top of a vehicle to provide temporary sleeping quarters for passengers above the surface of the ground.

The full objects and advantages of my invention will appear in connection with the detailed description thereof given in the following specification, and the novel features which produce the advantageous and useful result of my invention will be particularly pointed out in the claims.

In the drawings illustrating my invention in one of its forms:

Fig. 1 is a side elevation view showing the packaged form of the base-box mounted on the top of an automobile.

Fig. 2 is a side elevation view of the invention with the tent erected, the ladder in position and the door flap hanging down from the edge of the overhanging under wall on that side to permit entrance of a user of the tented bed.

Fig. 3 is a rear end elevation of the box bed and erected tent and ladder in position, as shown in Fig. 2.

Fig. 4 is a transverse sectional view of the base-box and tent parts supported therefrom without the mattress.

Fig. 5 is a vertical longitudinal sectional view of the same through the ridge pole.

Fig. 6 is a plan view of the package shown in Fig. 1 with parts of the folded tent and of the outside cover broken away to show the supporting parts on top of the bedding and bed under the folded tent and to show the ladder upon the folded tent under the top cover.

Fig. 7 is a sectional detail of a portion of the base-box showing the manner of securing the lower edge of the tent to the outside of all four walls of the base-box.

Fig. 8 is a sectional view of the manner in which the tubular side rail supports are removably secured to angularly disposed spreader rods.

Fig. 9 is a detail showing of the manner in which the end supports and the ridge pole are latched together to prevent spreading of the supports.

Fig. 10 is a detail showing of the manner in which the cover member is secured to the sides of the base-box, the hook members on said sides being shown in Fig. 7.

Fig. 11 shows the manner in which the door through the underhang part of the tent is secured in position by a slide fastener to assure a closure that will not permit entrance of insects.

Fig. 12 is an enlarged detail edge view of the side of the base-box showing the arrangement for hooking the ladder to the side of the base-box.

As illustrated and described, and particularly as shown in Figs. 1 and 4, there is shown secured to an automobile top 13 a base-box designated generally by the numeral 14. This box comprises a bottom wall 15, side walls 16 and 17 and end walls 18 and 19.

Within the space 20 inside of said base-box is positioned a mattress 21 covered with suitable bedding, sheets, pillows and the like 22. The automobile top package, designated generally as 23 in Fig. 1, contains the folded tent, later to be described in detail, the parts for supporting that tent and a ladder 24 which is laid on top of the folded tent, as shown in Fig. 6, and is under a cover member 25, shown in Figs. 1 and 6.

The cover member 25 is formed to fit tightly over the base-box 14 with its outside edges drawn over the side and end walls and secured, as shown in detail in Fig. 10, by means of a cord 26 extending through eyelets 27 on the outer edges of cover 25, the loops 28 of said cord being passed over hooks 29 on the outsides of the base-box 14. One of said hooks is shown in detail in Fig. 7.

The base-box 14 is removably held on the top 13 of an automobile by carriers, as indicated at 30 in Fig. 4. As these are well known means of securing an object upon the top of an automobile and externally thereof, the detailed description of them is not given herein.

A tent to be erected over the base-box 14 comprises bottom, outwardly and upwardly sloping underhanging walls 31 and 32, end walls 33 and 34 and sloping top walls 35 and 36.

It will be noted that the end walls have a central portion indicated at 37 which is secured to the end walls of the base-box 18 and 19, as shown in Fig. 3, and similarly the outwardly and upwardly sloping overhanging side walls are secured to the side walls 16 and 17 of the base-box in the same manner.

This manner is clearly indicated in detail in Fig. 7 and also in Figs. 2 and 4, where contacting portions 38 of the material, preferably a good grade of tent cloth such as canvas, is held between the outside faces of the side and end walls by means of a strip 39 of suitable material held by screws 40.

Thus, except for screened ventilating openings 41 and 42 in the end walls 33 and 34 and screened ventilating openings 43 and 44 in the outwardly and upwardly sloping underhanging bottom walls 31 and 32 and the door opening 45, all of the walls of the tent member are unbroken and the bottom walls are sealed to the base-box so as to exclude the entrance of any insects.

A flap 46, cut out of outwardly and upwardly sloping underhanging bottom wall 31, is adapted to close the opening 45, above described. As shown in Fig. 11, this flap is secured to the edges of opening 45 through wall 32 by a slide fastener which effectively excludes any insects getting into the tent at that point.

As shown in Figs. 3 and 12, the ladder 24 is provided with hooks 48 and 49 fastened to the side rails of the ladder. The hooks 48 and 49 go over keepers 50 and 51 secured to the side of said wall 17, as shown in detail in Fig. 12.

The solid supports for the tent structure are shown in detail in Figs. 4, 5, 6 and 9. These are specifically two end uprights 52 and 53 with sockets 54 covered on the outside by plates 55, as shown in Fig. 9. A ridge pole 56 of some fairly stiff metal such as brass has its ends seated in the sockets 54 and is latched to the uprights 52 and 53 by latch means 57, as shown in Fig. 9.

There are two side rails 58 and 59 which are formed of hollow or tubular material and have an elbow 60 secured to the ends of the supporting side rails 58 and 59 by means of an inner tube 61 which is riveted respectively to one part 62 of the elbow 60 and to the end portion 63 of the rails 58 and 59, as shown in detail in Fig. 8.

There are thus elbows at each end of the supporting side rails 58 and 59, or a total of four elbows to be connected with side rails 58 and 59. In corner posts 65 of the base-box 14 are sockets for four spreader rods specifically numbered 66, 67, 68 and 69, as shown, positioned on the mattress 21 to be under the top cover 25 when the material is packaged. The spreader rods 66, 67, 68 and 69 are illustrated in detail as to one of them, rod 66, in Fig. 8. As shown, these spreader rods are tubular and have a tubular extension member 70 which is secured at 71 within the spreader rods 66, 67, 68 and 69, as shown in Fig. 8.

The extension members 70 are removably fitted into the right-angled portion 72 of the several elbows 60, thus supporting the side rails 58 and 59 from their ends and holding the outer tent walls 35 and 36 in extended position. The side rails are held in position within the tent cover by contact with the end walls 33 and 34.

As shown in Fig. 4, flaps 73 and 74 of the top wall members 35 and 36 extend beyond the side rails 58 and 59 so that when there is rain, the run-off will be carried beyond the junction at that point and will not tend to run down the underside of the underhanging walls 31 and 32.

As shown in Figs. 4 and 6, upon the inside of the end walls 19 and 18 of base-box 14 are mounted keepers 75 and 76. These keepers are securely fastened to the insides of the end walls 19 and 18 by screws, bolts or other suitable fastenings and provide a socket space 77, Fig. 6, adapted to receive the lower ends of the upright end supports 52 and 53 and hold these supports firmly in vertical position.

As shown in Figs. 2 and 3, four guy ropes of which three are designated as 78, 79, and 81 are secured to the corners 82 of the canvas sloping top. As clearly shown, these guy ropes are tied to stakes 83 or similar fastening means on the ground and slope outwardly to some degree of the automobile and serve to anchor the canvas top. They are drawn tight and, in the position relative to the ridge pole, the side rails and the spreader rods, have the effect of pulling all the walls of the tent except the underhanging walls 31 and 32 smooth and tight.

The operation of my device starts when everything is packaged in the simple, compact form indicated in Fig. 1. The cover 25 can quickly be released by withdrawing the loops 28 from over the hook members 29. This exposes the base-box 14 and the attached tent member in its entirety with the ladder 24 on top of the folded tent member. The user readily withdraws the ladder and sets it in position, as indicated in Fig. 3. Then with the user on the ladder the door member 46 is released and pulled outwardly and one person crawls through the opening under the folded tent.

In that position the end uprights 52 and 53 are first erected in the sets of keepers 75 and 76. The ridge pole 56 is then lifted up and inserted in the openings 54 at the tops of the uprights 52 and 53. This lifts the central part of the tent member, and the latching means 57 is applied to the ridge pole at each of its ends, which is thus firmly connected with the uprights 52 and 53. This has provided an abundance of room to operate in completing setting up the tent.

First on one side and then on the other the side rails are connected with the spreader rods assembled in the rod sockets 64, which brings the underhanging walls 31 and 32 into general position and permits the door to swing into the position of Figs. 3 and 4.

The person erecting the tent then goes down the ladder, drives stakes at the appropriate points (which may be carried with the other material on the top of the bed) and the guy ropes are drawn tight and the tent is completely erected.

Ordinarily if the emergency brake is set on the car it is unnecessary to block the wheels, particularly if the car is standing on level ground, otherwise some form of blocking should be employed.

When it is desired to occupy the bed by one or two persons, they climb the ladder 24 under the flap door 46, pull that door closed using the slide fastener to fasten it insect-tight in position, and then with entire comfort remove clothing and put on pajamas or other night wear. The clothing, extra blankets and other miscellany, may be conveniently laid at either side upon the loose overhanging walls 31 and 32 and the persons in the bed and in the bed tent are ready for a good night's sleep and rest.

A very great advantage resides in the overhang of the sides of the tent which gives adequate room within the tent for dressing and undressing and excellent space for storing the clothes and other items.

Another advantage resides in the entrance opening being in the underhanging portion which extends laterally beyond the lateral limits of the vehicle body in that this provides a protected entrance during inclement weather and permits entry into the tent without exposure to the elements.

Another very great advantage comes from the fact that in connection with the overhang, guy ropes of not too great length can be run from the corners of the tent to stakes in the ground and the entire tent structure will be effectively held against practically any kind of wind pressure.

A final and important advantage resides in the fact that the tent structure can be erected and taken down and all of the parts, including the ladder, can be put into a compact package such as shown in Fig. 1 of the drawing, where it can be transported with very little increased wind resistance.

I claim:

1. An automobile top bed structure adapted to be attached to and supported by the top of an automobile, comprising a base box having a rigid bottom wall and side and end walls vertically extended therefrom and integrally connected therewith, a mattress held within the space defined by said end and side walls, said base box being secured to and removably supported on the top of the automobile, and a tent structure having lower edge portions thereof everywhere secured to the upper edges of the side and end walls, supporting parts including uprights, a ridge pole, side rails and spreader arms for the ends thereof, to be held upon the mattress under the tent when the tent is in folded condition, sockets at the centers of the box ends for the uprights to hold the ridge pole, and other sockets at the corners of the base box to hold the spreader arms and side rails, said sockets all held in fixed position under the folding tent body to permit the supporting parts to be positioned by a person within the folding tent to effect erecting of the tent.

2. An automobile top structure adapted to be attached to and supported by the top of an automobile, comprising a rectangular base box having a rigid bottom wall and side and end walls rigidly connected thereto and a mattress and bedding within said walls, said base box being removably supported upon and within the outer limits of the top of an automobile, a tent having its lower edge portions everywhere secured to the upper edges of the side and end walls, said tent enclosing a space above said mattress and bedding, means holding the tent extended a substantial distance above the top plane of said base box with portions of the tent held to extend outside the side limits of said base box, each of said last named portions being composed of the tent material, being V-shaped in cross-section and extending a substantial distance beyond and overhanging each of the sides of the automobile, an opening formed in the lower part of said overhang, and a flap of tent material adapted to hang down from the outer edge of said overhang and to form a closure for said opening.

3. A transportable shelter adapted to be carried and erected on an upper portion of a motor vehicle, comprising a rigid base member, a collapsible fabric tent carried by the base member for erection thereon, means securing the opposite lateral edges of the tent fabric to the outer limits of the base member, supporting means mounted on the base member and engaging the tent fabric between its opposite lateral edges beyond the lateral limits of the base member to form an upper cover which extends laterally on either side of the base member beyond the lateral limits of the base member and a lower underhang which extends inwardly from the outer limits of the upper cover to the base member, and means forming a closable opening in the underhang to permit entry into the tent through the underhang.

4. A transportable shelter adapted to be carried and erected on an upper portion of a motor vehicle, comprising a substantially rectangular rigid base member, a collapsible fabric tent formed of end walls and a top cover and underhanging portions carried by the base member for erection thereon, means securing the lower limits of the end walls and the top cover of the tent fabric to the outer limits of the base member, supporting means mounted on the base member and engaging the top cover of the tent fabric at a distance above the base member and beyond the lateral limits of the base member and forming underhanging portions which extend inwardly to the base member beneath the top cover, insect-proof ventilating means in at least one of the underhanging portions, and a means forming a closable opening in one of the underhanging portions to permit entry into the tent from beneath the underhanging portions.

5. A transportable shelter adapted to be carried and erected on the upper portion of a motor vehicle, comprising a rigid base member, a collapsible fabric tent carried by the base member for erection thereon, means securing the opposite lateral edges of the tent fabric to the lateral limits of the base member, supporting means mounted on the base member and engaging the tent fabric between the opposite lateral edges beyond the lateral limits of the base member to form an upper cover which extends laterally on either side of the base member beyond the lateral limits of the base member and lower underhanging portions which extend inwardly from the outer limits of the upper cover to the base member, an eave depending from the outer limits of each side of the upper cover for shedding moisture precipitated on the cover, one of said underhanging portions containing an opening between the base member and the respective eave and forming a protected entry into the tent, a flap, carried by said underhanging portion adjacent said opening and forming a closure therefore, and fastening means cooperable between said flap and the adjacent underhanging portion for sealing said flap relative to said opening.

FRANCIS R. DALY.

References Cited in the file of this patent

UNITED STATES PATENTS

| Number | Name | Date |
| --- | --- | --- |
| 1,241,342 | Chapman | Sept. 25, 1917 |
| 1,479,258 | Simons | Jan. 1, 1924 |
| 1,707,270 | Lichtenberg | Apr. 2, 1929 |
| 1,803,237 | Crooke | Apr. 28, 1931 |
| 1,984,681 | Jackson | Dec. 18, 1934 |
| 2,152,713 | Stewart | Apr. 4, 1939 |
| 2,239,951 | Bromschwig | Apr. 29, 1941 |
| 2,291,900 | Jimmes | Aug. 4, 1942 |
| 2,500,650 | Will | Mar. 14, 1950 |
| 2,561,168 | Beckley | July 17, 1951 |
| 2,632,667 | Gray | Mar. 24, 1953 |